(12) United States Patent
Zhao et al.

(10) Patent No.: US 10,268,750 B2
(45) Date of Patent: Apr. 23, 2019

(54) LOG EVENT SUMMARIZATION FOR DISTRIBUTED SERVER SYSTEM

(71) Applicant: AppDynamics LLC, San Francisco, CA (US)

(72) Inventors: Yuchen Zhao, Belmont, CA (US); Arjun Iyer, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 350 days.

(21) Appl. No.: 15/011,022

(22) Filed: Jan. 29, 2016

(65) Prior Publication Data

US 2017/0220663 A1    Aug. 3, 2017

(51) Int. Cl.
G06F 17/30    (2006.01)
G06F 11/30    (2006.01)

(52) U.S. Cl.
CPC ........ G06F 17/30598 (2013.01); G06F 11/30 (2013.01); G06F 17/30368 (2013.01); G06F 17/30705 (2013.01)

(58) Field of Classification Search
CPC ..................................................... G06F 17/30
USPC ........................................................ 707/737
See application file for complete search history.

(56) References Cited

U.S. PATENT DOCUMENTS

| 7,644,076 B1 | 1/2010 | Ramesh et al. |
| 7,716,229 B1 * | 5/2010 | Srivastava ............. G06Q 30/02 707/737 |
| 7,912,705 B2 * | 3/2011 | Wasson ................. G06F 17/241 704/9 |
| 8,087,087 B1 | 12/2011 | van Oorschot et al. |
| 8,484,238 B2 * | 7/2013 | Loeser .............. G06F 17/30672 707/705 |
| 8,589,370 B2 * | 11/2013 | Feng ..................... G06F 17/277 707/705 |
| 8,943,056 B2 * | 1/2015 | Baum ............... G06F 17/30619 707/736 |
| 9,621,576 B1 * | 4/2017 | Oprea ................. H04L 63/1441 |
| 9,818,145 B1 * | 11/2017 | Finkelstein ........ G06Q 30/0631 |
| 2007/0238487 A1 * | 10/2007 | Kuhl ...................... H04M 1/56 455/566 |
| 2009/0100559 A1 * | 4/2009 | Christian ............... A42B 1/248 2/10 |
| 2011/0185234 A1 | 7/2011 | Cohen et al. |
| 2014/0237337 A1 | 8/2014 | Baum et al. |

OTHER PUBLICATIONS

International Search Report dated Mar. 31, 2016 in connection with PCT/US2016/015783.

* cited by examiner

*Primary Examiner* — Kim T Nguyen
(74) *Attorney, Agent, or Firm* — Behmke Innovation Group LLC; James Behmke; Stephen D. LeBarron

(57) ABSTRACT

Clusters of log lines are identified based on log line templates. The log line templates are based on a punctuality pattern for a log line. Clusters of log lines that match each punctuality pattern can be identified based on comparisons between the log lines. The comparison may determine the similarity of the log lines and ultimately identify whether the log lines are close enough to be clustered. The comparison may be based on generated n-grams for the log lines and performing a hash on the n-grams. The resulting cluster information may be communicated to a user in an interface.

20 Claims, 7 Drawing Sheets

LOG EVENT SUMMARIZATION FOR DISTRIBUTED SERVER SYSTEM

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most systems being monitored include numerous logs that track system activity and events. The quantity of information provided by these logs is immense, often amounting to terabytes of data generated per day. Because of this excessive quantity of data, log data is not often processed or relied upon by monitoring systems to extract much information.

These large amount of data can be very difficult to investigate manually. In addition, the log format is usually designed for machines, which presents additional challenges for humans to process. Thus, the values from log events are sometimes overlooked and important insights from logs are typically unidentified.

What is needed is an improved system for extracting information from log management systems providing information in a human readable manner.

SUMMARY

The present technology, roughly described, identifies clusters of log lines based on log line templates. The log line templates are based on a punctuality pattern for a log line. Clusters of log lines that match each punctuality pattern can be identified based on comparisons between the log lines. The comparison may determine the similarity of the log lines and ultimately identify whether the log lines are close enough to be clustered. The comparison may be based on generated n-grams for the log lines and performing a hash on the n-grams. The resulting cluster information may be communicated to a user in an interface. In some instances, a bubble graph may be provided that shows bubbles for each identified cluster of log lines. The bubbles may be coordinated in size, color, and location to indicate the size of the cluster, the age of the cluster, for example whether the cluster is new, old, or missing, an origin of the log line, and other data.

An embodiment may include a method for monitoring a synthetic distributed business transaction. The method may include collecting log event data by one or more agents installed on one or more machines that perform a distributed business transaction. The log event data may be grouped by data format. Clusters for the log event data may be generated within each group. The clusters of log event data may be reported from multiple machines in a user interface.

An embodiment may include a system for monitoring log event data. The system may include a plurality of machines, with each machine including a processor and memory, and one or more modules stored in memory and executable by the processor. When executed, the modules may receive log event data from a plurality of agents, wherein the log event data received by a particular machine grouped by data format, generate clusters for the log event data within each group, and report the clusters of log event data to a remote server.

DETAILED DESCRIPTION

The present technology, roughly described, identifies clusters of log lines retrieved while monitoring a distributed business transaction. The log line clusters are identified based on log line templates. The log line templates are based on a punctuality pattern for a log line. Clusters of log lines that match each punctuality pattern can be identified based on comparisons between the log lines. The comparison may determine the similarity of the log lines and ultimately identify whether the log lines are close enough to be clustered. The comparison may be based on a portion or an aspect of the log lines rather than the entire log lines. For example, the comparison may be performed only on generated n-grams for the log lines. In comparing the log lines, a hash operation can be performed on the n-grams, for example. The resulting cluster information, based on the comparison, may be communicated to a user in an interface. In some instances, one or more indications or feedback can be provided to the user to identify the clusters to the user. For example, a visual indication, such as a bubble graph may be provided that shows bubbles for each identified cluster of log lines. The bubbles may be coordinated in size, color, and location to indicate the size of the cluster, the age of the cluster, for example whether the cluster is new, old, or missing, an origin of the log line, and other data.

Figure 1:
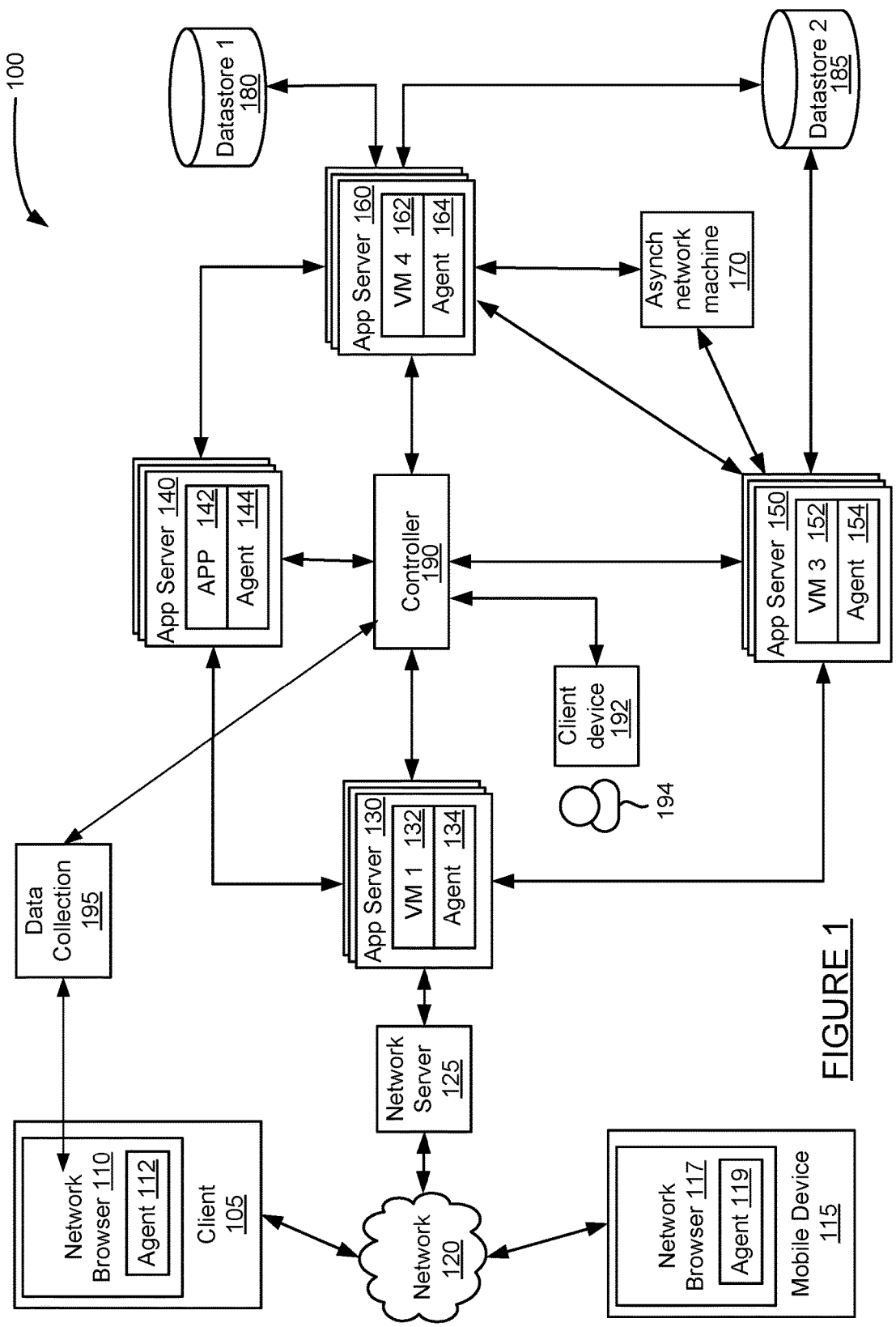
FIG. 1 is a block diagram of a monitoring system that monitors log lines.

FIG. 1 is a block diagram of a system for monitoring a distributed business transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Mobile device may also include client applications and other code that may be monitored by agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may report data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130 or one or more separate machines. When network 120 is the Internet, network server 125 may be implemented as a web server.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .Net, and Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, servers 130, 140, 150, and 160 may each include Java code, .Net code, PHP code, Ruby code, C code, C++ or other binary code to implement applications and process requests received from a remote source. References to a virtual machine with respect to an application server are intended to be for exemplary purposes only.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .Net, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent 220 may collect flow data as well as data associated with the execution of a particular application. The language agent may instrument the lowest level of the application to gather the flow data. The flow data may indicate which tier is communicating which with which tier and on which port. In some instances, the flow data collected from the language agent includes a source IP, a source port, a destination IP, and a destination port. The language agent may report the application data and call chain data to a controller. The language agent may report the collected flow data associated with a particular application to network agent 230.

A network agent may be a standalone agent that resides on the host and collects network flow group data. The network flow group data may include a source IP, destination port, destination IP, and protocol information for network flow received by an application on which network agent 230 is installed. The network agent 230 may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then reports the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 210 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878, 919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
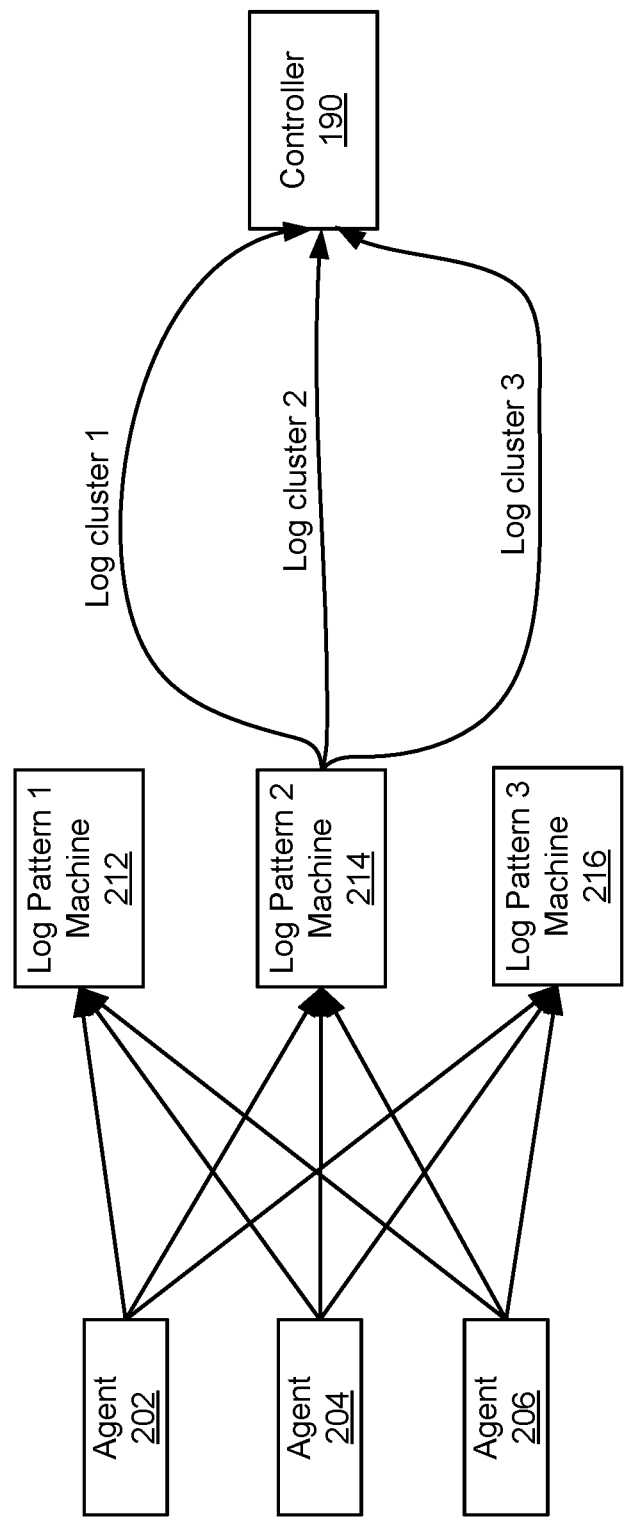
FIG. 2 is a block diagram of a log line processing system.

FIG. 2 is a block diagram of a log line processing system. The system of FIG. 2 includes agents 202, 204 and 206, log pattern machines 212, 214, and 216, and controller 190. Agents 202-206 may include agents monitoring a distributed system being monitored, including such agents as 134-164 in the block diagram of FIG. 1. Each agent may retrieve log lines from logs on the particular servers on which the agents are implemented. Once retrieved, each agent may determine whether each log line conforms to a log line template and transmit the particular log line to a log pattern machine based on the template which matches the log line.

Log line templates may be based on a variety of factors. In some instances, log line templates may be based on punctuality patterns in the log line. For example, log lines may include spaces, periods, commas, slashes, and other delimiters that are used to separate data fields. Certain machines may provide certain patterns of log lines that include specific delimiters. Identifying a pattern of a delimiters within a log line allows a log line template to be created.

For example, a log line may be in the format of:
13:23:33 user AAA server-1234 search-1
In this example, the punctuation pattern may be as follows:
[TIME] ␣ user ␣ [username] ␣ server-[servername] ␣ [function description].

The delimiters "␣" representing a space and "-" representing a dash are used to separate the log fields in the log line. Hence, a pattern of space-space-space-space-dash-space may form a punctuation pattern for this log line.

Log lines having a punctuation pattern that match a stored punctuation pattern are provided to a particular log pattern machine. Each log pattern machine 212, 214, and 216 receive log lines that match a particular log line template. In some instances, to match the template, only the delimiters need to be matched. There is no requirement as to the field values between the punctuation delimiters.

Each log pattern machine receives log lines that match a particular template and process the log lines to determine if the log lines fall within certain clusters. To identify clusters, a hash is performed between two log lines to determine the similarity of log lines. In some implementations, a portion of an aspect of the log lines are processed rather than the entire log lines For example, n-grams can be generated for fields of the two log line and a locality sensitive hash is performed on the n-grams. If the hash values generated from the hash operation satisfy a particular threshold, for example a K-means clustering algorithm, then the log lines are determined to be part of a cluster.

Log pattern machines may include objects and other code for receiving log lines, clustering log lines, and providing the log lines to controller 190. The code may be implemented as one or more modules that may perform this and other functionality as described herein.

Over time, cluster data generated by a log pattern machine is provided to controller 190. The cluster information may include log line data, such as for example a summarized log line string that indicates the values of the log line cluster and the number of log lines within the cluster. In the system of FIG. 2, log pattern machine 214 provides three clusters of data to controller 190. This corresponds to three identified clusters of log lines generated from those log lines that satisfy a template associated with log pattern machine 214. Controller 119 may then generate a bubble chart based on the received log line cluster data and report the bubble chart to requesting users and administrators.

Figure 3:
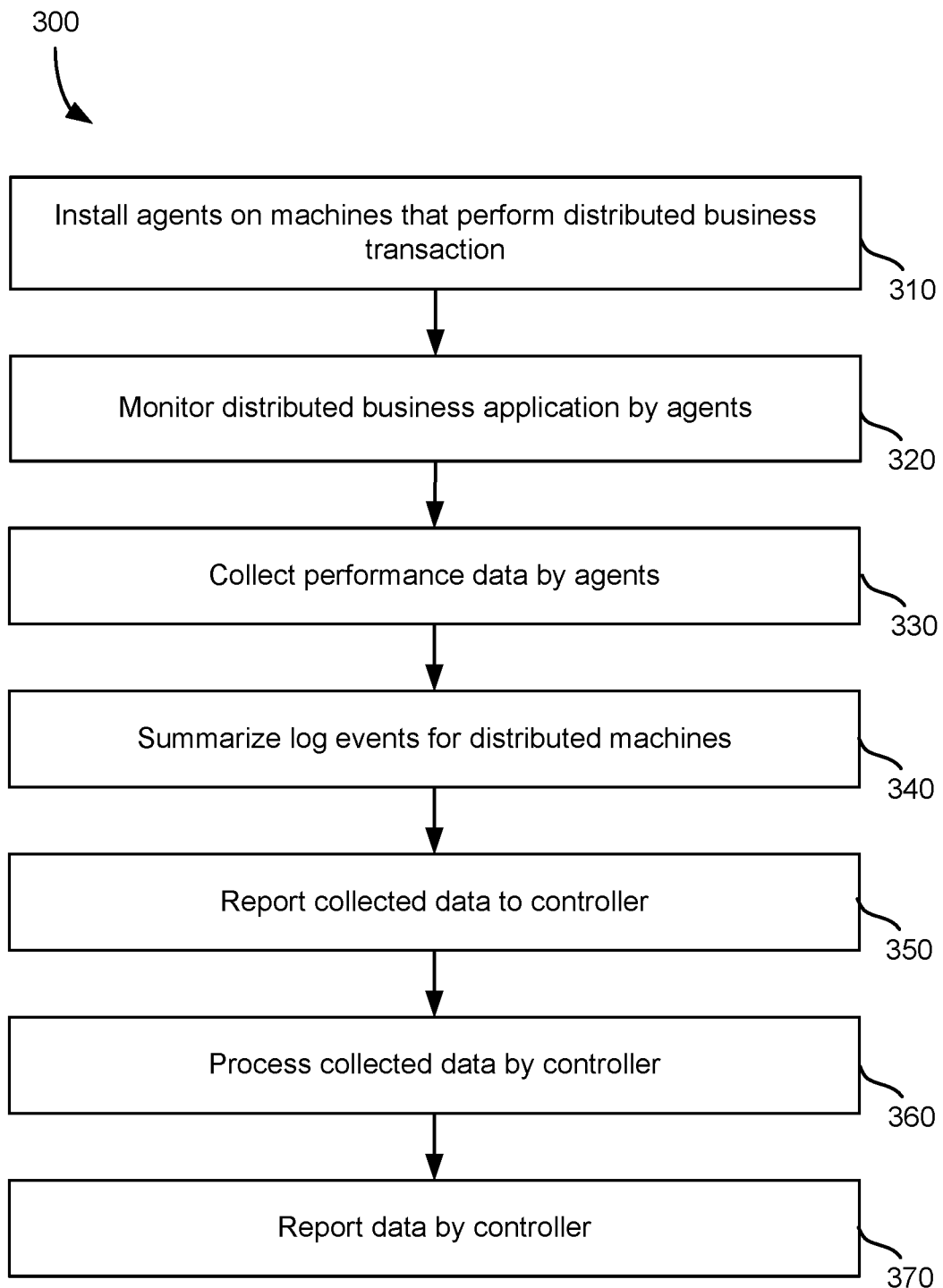
FIG. 3 is a method for monitoring and processing log lines.

FIG. 3 is a method for monitoring and processing log lines. First, agents are installed on machines that perform distributed business transactions at step 310. The agents may be installed on servers 130, 140, 150, and 160, as well as any other servers that may process a distributed business transaction. The distributed business transaction is monitored by the agents at step 320. Monitoring a transaction may include having each agent monitor a particular application occurring on a particular server. Data may be collected by an agent, aggregated, and reported to a controller periodically, upon request, or upon some other event. Each agent may also collect log lines created by one or more logs on the application it is monitoring, logs associated with an application server it is hosted upon, or any other log accessible by the particular agent.

Performance data is collected by the agent at step 330. The collected performance data may include the start and stop time of a particular request, calls to other applications or systems, calls received by other applications or systems, and other data. The collected data may also include log lines generated by an application, system, or other entity that can be accessed by the agent.

Log events may be summarized for the distributed machines at step 340. Summarizing the log events may include defining templates, grouping log lines by template format, and generating clusters based on the difference of log lines associated with a particular template. Summarizing log events is discussed in more detail below with respect to the method of FIG. 4.

Collected data is reported to a controller by each agent at step 350. Each agent may report the data periodically, upon request by controller, upon an event detected by an agent, or based on some other event. A controller may process collected data at step 360. Processing the collected data may include stitching data from different servers together to form a distributed business transaction data set, generating metrics from the collected data, generating graphics and user interface elements of the user data, and other processing.

Data may be reported by a controller at step 370. In the case of log line data, the data may be reported in a bubble graph through a user interface provided by controller 190. The bubble graph may consist of user interface with one or more bubbles positioned within graphical coordinates. Each bubble may indicate a cluster of Log lines considered to satisfy a particular punctuation template and be relatively similar in field values. Reporting data by controller is discussed in more detail below with respect to the method of FIG. 6. The log line data may be reported in formats other than a bubble graph as well, such as for example a bar graph.

Figure 4:
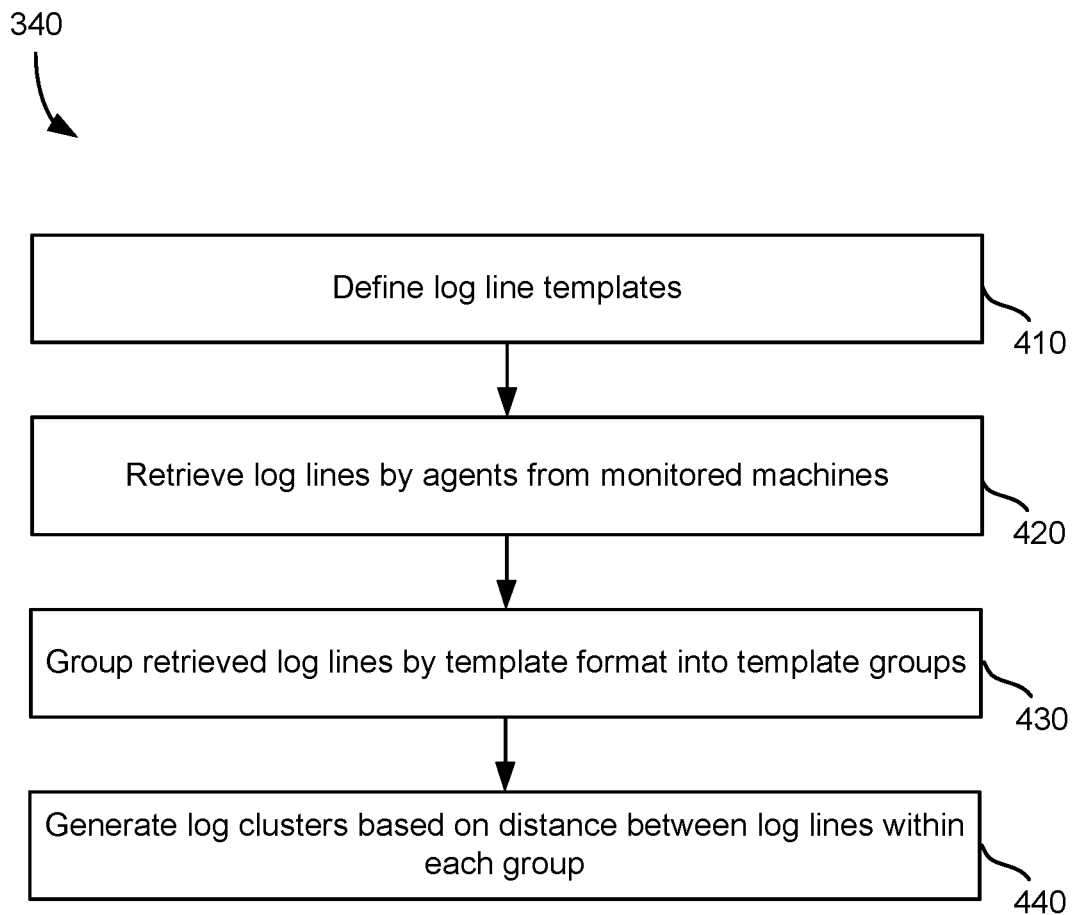
FIG. 4 is a method for summarizing log events for distributed machines.

FIG. 4 is a method for summarizing log events for distributed machines. The method of FIG. 4 provides more detail for step 340 the method of FIG. 3. First, log line templates are defined at step 410. Log line templates may be defined based on punctuation patterns within a particular log line. For example, each the log line may include of a series of delimiters and field values, wherein the delimiters separate the field values. The pattern of delimiters may define the punctuation pattern. For example if a log line has three values all separated by a space, the punctuation pattern for that log line would consist of three spaces that separate field values.

Log lines are retrieved by agents from the monitored machines at step 420. The agents may retrieve the log lines as they are made available from a log controller on each application, machine, or other entity accessible by an agent on a particular server. The retrieved log lines are grouped by template format into template groups at step 430. For each log line, the agent determines of the particular log line matches a particular template. In some instances, a series of log pattern machines may be configured to process log lines associated with a particular template. When an agent determines that a log line matches a template, it transmits that log line to the log pattern machine associated with that template. Hence, each agent may send log lines to each of a plurality of log pattern machines based on whether the log line matches the template associated with that log pattern machine.

Log clusters are generated based on the distance between log lines within each group at step 440. Generating log clusters may include, for each log pattern machine that receives log lines, generating a hash between the log lines and computing the distance between the two log lines based on the hash values. In some instances, the hash may be performed on each pair of n-grams between two log lines. Generating clusters of log lines based on a distance calculation between two log lines is discussed in more detail below with respect to the method of FIG. 5.

Figure 5:
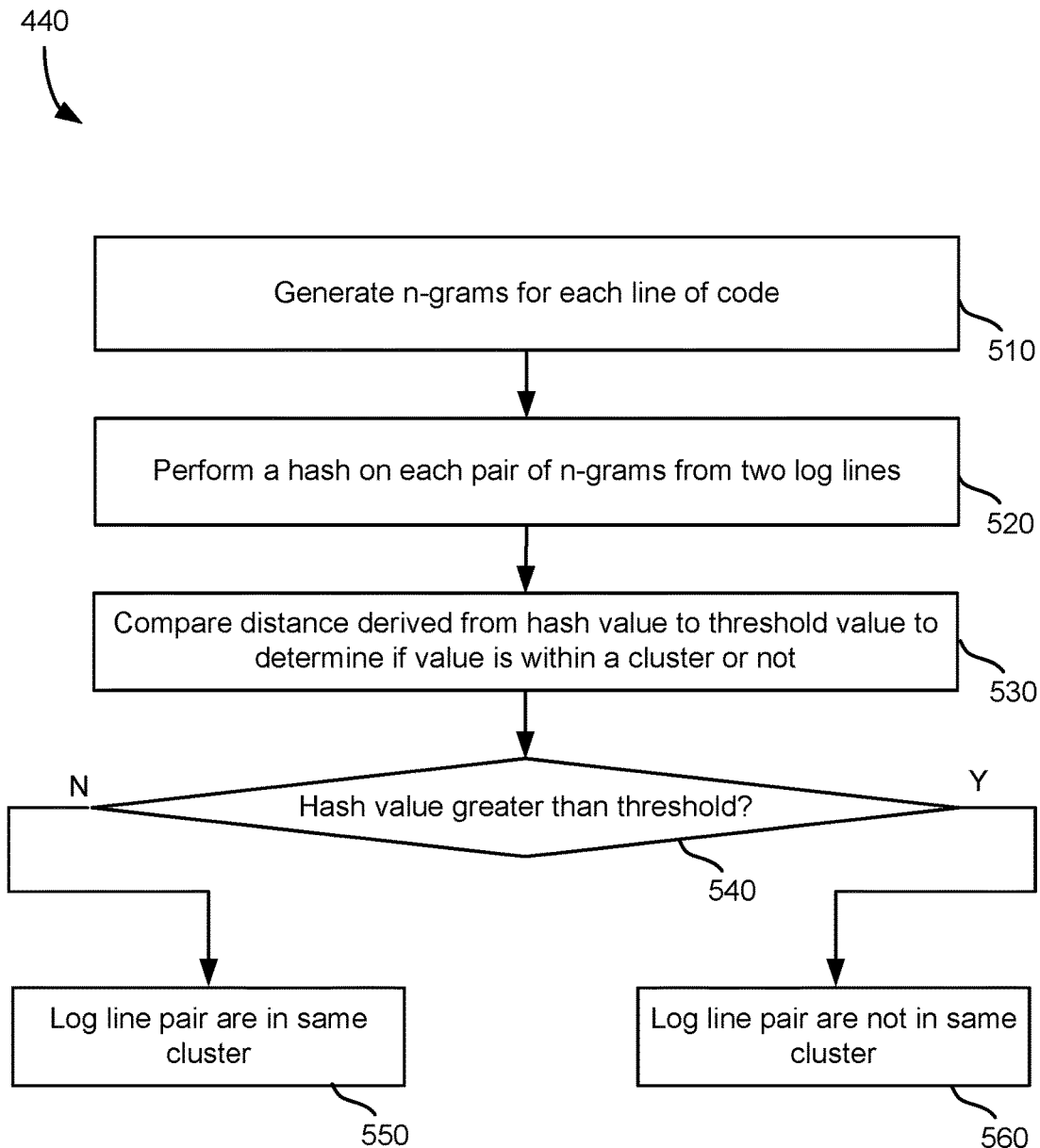
FIG. 5 is a method for generating log line clusters.

FIG. 5 is a method for generating log line clusters. The method FIG. 5 provides more detail for step 440 of the method of FIG. 4. First, n-grams are generated for each line of code at step 510. The n-gram may be a contiguous sequence of items from a given sequence of text or speech, in this case a log line. The items in the log line may be letters, words, or values separated by delimiters in a log line.

A hash may be performed on each pair of n-grams from the two selected log lines at step 520. The hash may provide a uniform method for determining a distance between two n-grams. If the n-grams are identical, the hash value will be one. In some instances, the more the n-gram values differ, the closer to zero the hash value will be. The distance derived from the hash values are compared to a threshold value to determine if the value is within a cluster or not at step 530. In some instances, each hash generated for each pair of n-grams is summed to determine a total hash. The total hash is then compared to the threshold value determine if the log lines should be clustered together. In some instances, the hash value is normalized such that a value of one (1) means the n-grams are identical and the hash value of zero (0) means the hash values are completely different. In some instances, a threshold of 0.5, 0.6, or 0.7 may be used to determine if the hash values should be clustered or not.

If at step 540 the hash values are determined to be greater than a threshold, than the log line pairs are determined to be in the same cluster at step 550. A cluster identifier is associated with each hash and log lines associated with a particular cluster are transmitted to a controller at step 190. If the hash values are determined not to be greater than the threshold, then the log line pairs are not considered in the same cluster and no action is taken.

Figure 6:
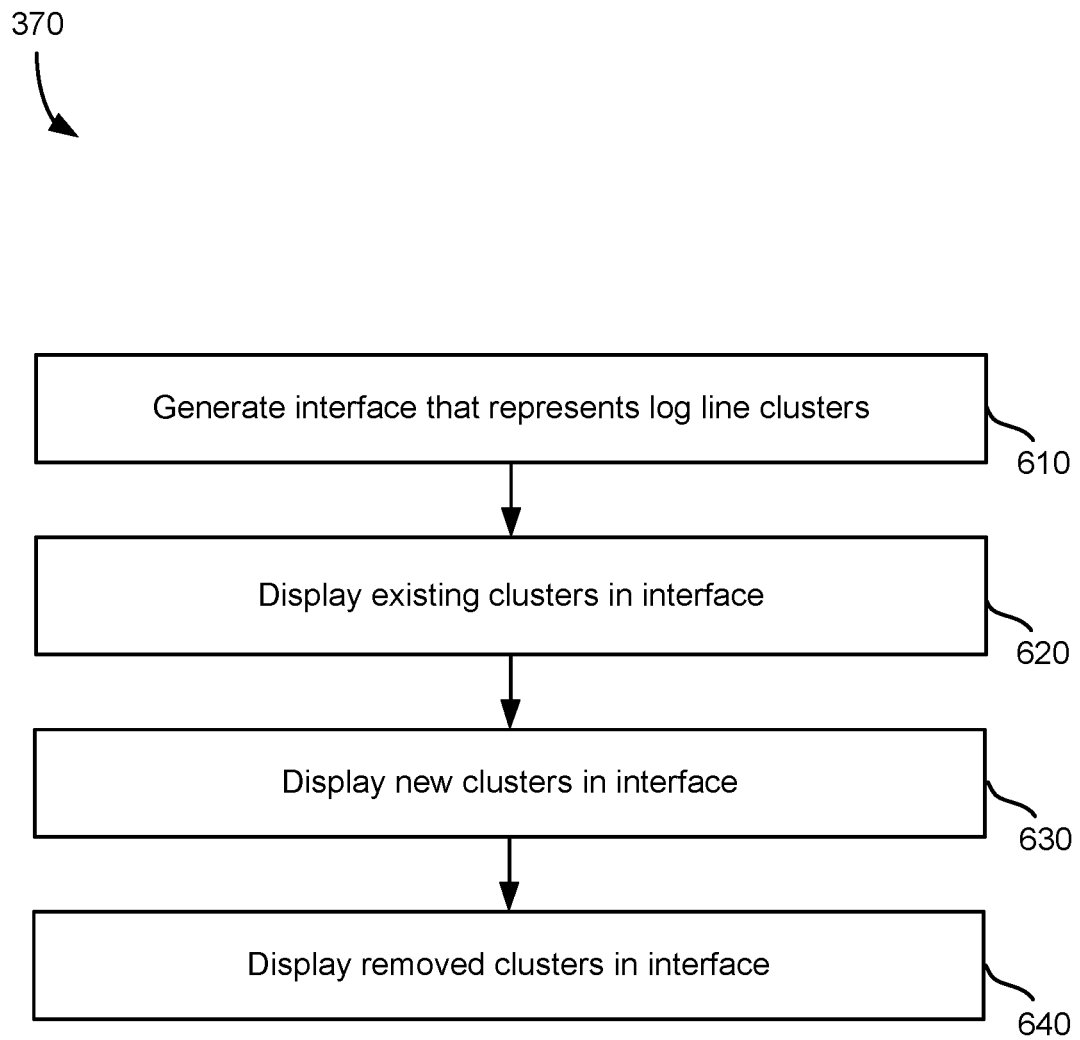
FIG. 6 is a method for reporting log summarization data by controller.

FIG. 6 is a method for reporting log summarization data by controller. Method of FIG. 6 provides more detail for step 370 the method FIG. 3. An interface may be generated that represents log line clusters at step 610. The interface may include two-dimensional and/or three dimensional graphical axes, grids, a legend, and other graphical information. Existing clusters may be displayed in the interface at step 620. The existing clusters may be those that have been identified by one or more log pattern machines for an ongoing period of time. New clusters may be displayed in the interface at step 630. The new clusters are those that may be received from a log pattern machine and have not been previously identified. Removed clusters may be displayed in the interface at step 640. The removed clusters are those that have been previously reported to controller 190 but have since not been reported. These may be important to identify a function that is no longer operating, or some other turn of events in a system.

Each bubble may be configured with a particular color, shape, and position to indicate a life of the cluster, size of the cluster, and other information. For example, a larger bubble may indicate a cluster having the larger number of Log lines than that of a smaller bubble. A bubble that is green may indicate that the bubble has existed for at least a threshold period of time, such as at least two days. A bubble that is blue may indicate that the bubble has recently disappeared but has been provided for at least a number of days. A bubble that is orange may indicate a cluster of Log lines that has only recently been created.

Figure 7:
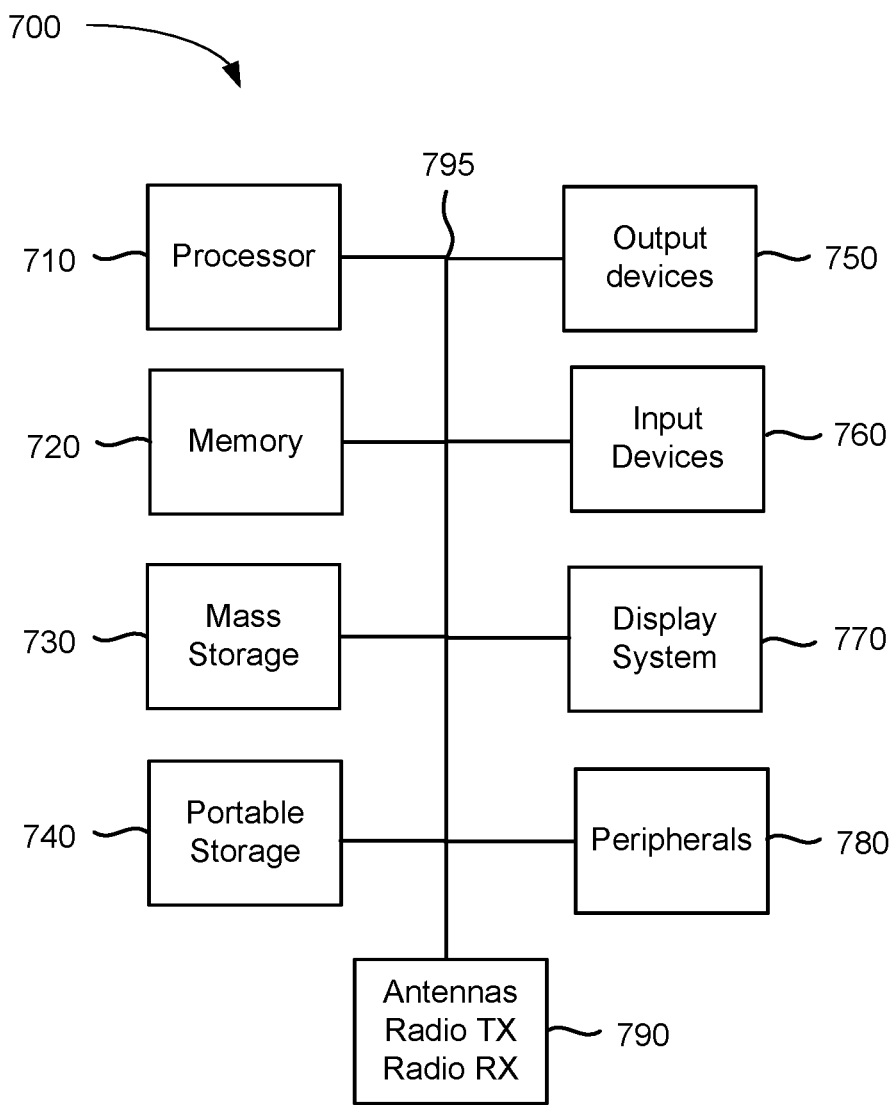
FIG. 7 is a block diagram of a computing environment for implement in the present technology.

FIG. 7 is a block diagram of a system for implementing the present technology. System 700 of FIG. 7 may be implemented in the contexts of the likes of client computers 105, 192, mobile device 115, servers 125, 130, 140, 150, 160, machine 170, data stores 180 and 190, and controller 190. The computing system 700 of FIG. 7 includes one or more processors 710 and memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive, an optical disk drive, a flash drive, or other device, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a floppy disk, compact disk or Digital video disc, USB drive, memory card or stick, or other portable or removable memory, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device. Display system 770 may also receive input as a touch-screen.

Peripherals 780 may include any type of computer support device to add additional functionality to the computer system. For example, peripheral device(s) 780 may include a modem or a router, printer, and other device.

The system of 700 may also include, in some implementations, antennas, radio transmitters and radio receivers 790. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, iOS, Android, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for monitoring log event data, comprising:
   collecting log event data by one or more agents installed on one or more machines that perform a distributed business transaction;
   determining, by the one or more agents, whether the log event data matches a punctuation pattern associated with one of a plurality of templates, wherein the punctuation pattern includes at least one delimiter and at least one field value;
   grouping the log event data into a particular group based on which of the plurality of templates the log event data matches; and
   generating clusters for the log event data within each group based on a distance calculation between log data within the particular group.

2. The method of claim 1, further comprising:
   routing the log event data to a particular remote machine based on which template of the plurality of templates the log event data matches, wherein the particular remote machine is associated with a particular template of the plurality of templates.

3. The method of claim 1, wherein generating clusters includes determining a distance between each log event data within a particular group.

4. The method of claim 3, wherein determining a distance includes generating an n-gram for each log event data.

5. The method of claim 3, wherein determining a distance includes generating a hash for log event data.

6. The method of claim 1, wherein generating clusters includes clustering two log event data together if the distance between the two log event data is within a threshold.

7. The method of claim 1, further including reporting the clusters of log event data from multiple machines in a user interface.

8. A non-transitory computer readable storage medium having embodied thereon a program, the program being executable by a processor to perform a method for monitoring log event data, the method comprising:
   collecting log event data by one or more agents installed on one or more machines that perform a distributed business transaction;
   determining, by the one or more agents, whether the log event data matches a punctuation pattern associated with one of a plurality of templates, wherein the punctuation pattern includes at least one delimiter and at least one field value;
   grouping the log event data into a particular group based on which of the plurality of templates the log event data matches; and
   generating clusters for the log event data within each group based on a distance calculation between log data within the particular group.

9. The non-transitory computer readable storage medium of claim 8, the method further comprising:
   routing the log event data to a particular remote machine based on which template of the plurality of templates the log event data matches, wherein the particular remote machine is associated with a particular template of the plurality of templates.

10. The non-transitory computer readable storage medium of claim 8, wherein generating clusters includes determining a distance between each log event data within a particular group.

11. The non-transitory computer readable storage medium of claim 10, wherein determining a distance includes generating an n-gram for each log event data.

12. The non-transitory computer readable storage medium of claim 10, wherein determining a distance includes generating a hash for log event data.

13. The non-transitory computer readable storage medium of claim 8, wherein generating clusters includes clustering two log event data together if the distance between the two log event data is within a threshold.

14. The non-transitory computer readable storage medium of claim 8, further including reporting the clusters of log event data from multiple machines in a user interface.

15. A system for monitoring log event data, the system comprising:
   a plurality of machines, each machine including a processor and memory,
   one or more modules stored on each of the plurality machines, the one or more modules stored in memory and executable by a corresponding processor to:
      receive log event data from a plurality of agents installed on the plurality of machines that perform a distributed business transaction,
      determine whether the log event data matches a punctuation pattern associated with one of a plurality of templates, wherein the punctuation pattern includes at least one delimiter and at least one field value,
      group the log event data into a particular group based on which of the plurality of templates the log event data matches, and
      generate clusters for the log event data within each group based on a distance calculation between log data within the particular group.

16. The system of claim 15, wherein one or more modules are further configured to:
   route the log event data to a particular remote machine based on which template of the plurality of templates the log event data matches, wherein the particular remote machine is associated with a particular template of the plurality of templates.

17. The system of claim 15, the one or more modules further executable to determine a distance between each log event data within a particular group.

18. The system of claim 17, wherein determining a distance includes generating an n-gram for each log event data.

19. The system of claim 17, wherein determining a distance includes generating a hash for log event data.

20. The system of claim 15, the one or more modules further executable to reporting the clusters of log event data from multiple machines in a user interface.

* * * * *